United States Patent [19]

Suzaki et al.

[11] Patent Number: 4,620,249
[45] Date of Patent: Oct. 28, 1986

[54] APPARATUS FOR DRIVING A FLOPPY DISC

[75] Inventors: Masayuki Suzaki; Tetsuro Hirota; Tetsuo Kanno; Takeziro Koguchi, all of Tokyo, Japan

[73] Assignee: Ricoh Company, Ltd., Tokyo, Japan

[21] Appl. No.: 369,682

[22] Filed: Apr. 19, 1982

[30] Foreign Application Priority Data

Apr. 28, 1981 [JP] Japan .................................. 56-65406
Jun. 25, 1981 [JP] Japan .................................. 56-98942

[51] Int. Cl.$^4$ ...................... G11B 17/04; G11B 5/012
[52] U.S. Cl. ........................................ 360/99; 360/97; 360/71
[58] Field of Search ...................... 360/97, 98, 99, 71, 360/86

[56] References Cited

U.S. PATENT DOCUMENTS

| | | | |
|---|---|---|---|
| 3,940,793 | 2/1976 | Bleiman | 360/99 |
| 4,040,107 | 8/1977 | Bryer | 360/99 |
| 4,139,876 | 2/1979 | Owens | 360/97 |
| 4,306,259 | 12/1981 | Saito et al. | 360/99 |
| 4,352,132 | 9/1982 | Gyi | 360/97 |

Primary Examiner—Raymond F. Cardillo, Jr.
Assistant Examiner—Steven R. Garland
Attorney, Agent, or Firm—David G. Alexander

[57] ABSTRACT

An apparatus for driving a floppy disc includes a first sensor responsive to a magnetic disc encased in a jacket of the floppy disc. Before the magnetic disc is gripper in a predetermined position, a d.c. motor included in a disc rotating mechanism is started in order to prevent rush current therethrough. After the start of the d.c. motor, a second sensor senses a return of the magnetic disc to a predetermined regular position whereupon a cone load drive source is activated to automatically move a cone toward a drive hub. Thus, the magnetic disc can be gripped and set in the regular position merely by inserting it into the apparatus. The apparatus also includes ejection apparatus for ejecting the floppy disc.

8 Claims, 21 Drawing Figures

APPARATUS FOR DRIVING A FLOPPY DISC

BACKGROUND OF THE INVENTION

The present invention relates to an apparatus for driving a floppy disc for use with a word processor or the like.

A floppy disc applicable to an apparatus of the type described has a magnetic disc encased in a jacket. When the floppy disc is manually inserted into the apparatus, the magnetic disc becomes gripped by and between a drive hub and a cone along the edge around its central hole under predetermined pressure. A motor connected to the drive hub is then energized to rotate the drive hub and thereby the magnetic disc while, at the same time, a head is brought into contact with the magnetic disc through a predetermined slotted portion of the jacket to record or reproduce desired data.

The floppy disc is loaded into the apparatus through an inlet and advanced deeper into the apparatus through a gap between the drive hub and the cone which are then spaced from each other. The magnetic disc of the floppy disc becomes retained in a predetermined position when a pivotal door is manually closed to move the cone toward the drive hub. Thus, such a means for setting the magnetic disc in the apparatus requires troublesome manipulation for opening and closing the door. Alternatively, the pivotal door may be replaced by a knob which is accessible to an operator for moving the cone toward the drive hub through a force imparting mechanism, a leaf spring and the like which are operatively connected with the knob, as disclosed in Japanese Patent Application nos. 55-52557/ 1980 and 55-52558/1980 layed open to public inspection, for example. Though advantageous over the door in the aspect of space requirement, the knob suffers from the same drawback as the door because of the manual setting system.

Heretofore, an a.c. motor has generally been employed as a source of hub drive for rotating the magnetic disc. However, a d.c. motor is more preferable than the a.c. motor in view of the fact that the latter must have its frequency adjusted depending on the area for use, such as 50 Hz to 60 Hz or vice versa. A d.c. motor still involves rush current which is inevitable at a start of the motor.

SUMMARY OF THE INVENTION

A floppy disc driving apparatus embodying the present invention automatically drives a floppy disc which is rotated by a driving motor about an opening formed at the center thereof when data are to be recorded in or reproduced from the floppy disc by a head mechanism. The apparatus comprises floppy disc gripping means for drivably gripping the floppy disc at a first predetermined position inside the apparatus, sensor means for sensing whether the floppy disc has been inserted into the apparatus to be gripped at the first predetermined position and producing a detection signal if the floppy disc has been so conditioned, and drive source means for actuating the floppy disc gripping means in response to the detection signal of the sensor means to grip the floppy disc at the first predetermined position.

In accordance with the present invention, a floppy disc driving apparatus includes a first sensor responsive to a magnetic disc encased in a jacket of the floppy disc. Before the magnetic disc is gripped in a predetermined position, a d.c. motor included in a disc rotating mechanism is started in order to prevent rush current therethrough. After the start of the d.c. motor, a second sensor senses a return of the magnetic disc to a predetermined regular position whereupon a cone load drive source is activated to automatically move a cone toward a drive hub. Thus, the magnetic disc can be gripped and set in the regular position merely by inserting it into the apparatus.

It is therefore an object of the present invention to provide an efficiently operable apparatus for driving a floppy disc which causes a magnetic disc to be automatically set in a predetermined position merely by inserting the floppy disc into the apparatus.

It is another object of the present invention to provide a generally improved apparatus for driving a floppy disc.

Other objects, together with the foregoing, are attained in the embodiments described in the following description and illustrated in the accompanying drawings.

DESCRIPTION OF THE PREFERRED EMBODIMENTS

While the floppy disc driving apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
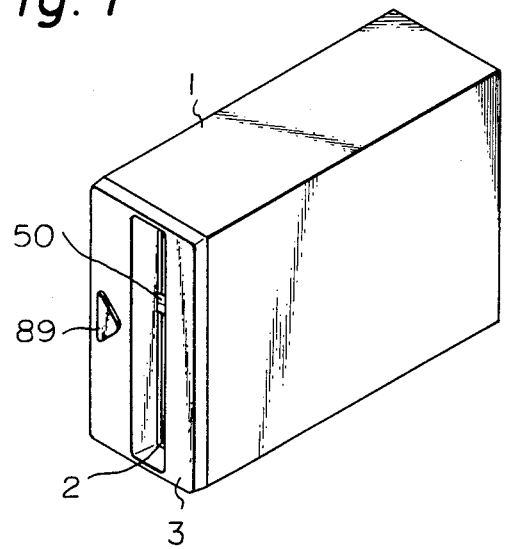
FIG. 1 is a perspective external view of a floppy disc driving apparatus embodying the present invention.
Figure 2:
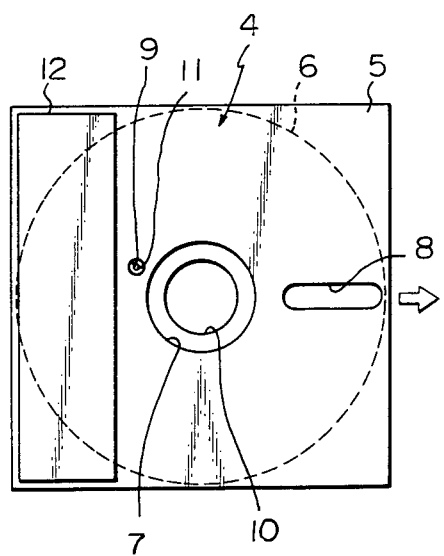
FIG. 2 is a side elevation of a floppy disc for use with the apparatus of the present invention.
Figure 3:
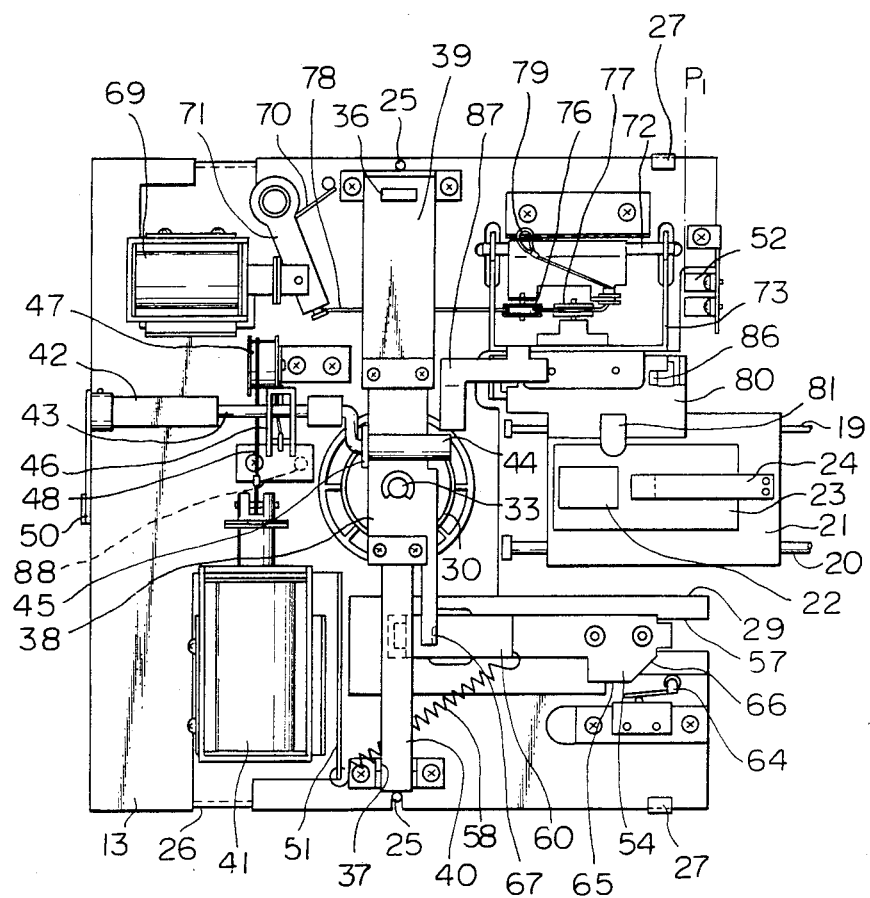
FIG. 3 is a side elevation showing an internal arrangement of the apparatus shown in FIG. 1 in an unloaded condition.
Figure 4:
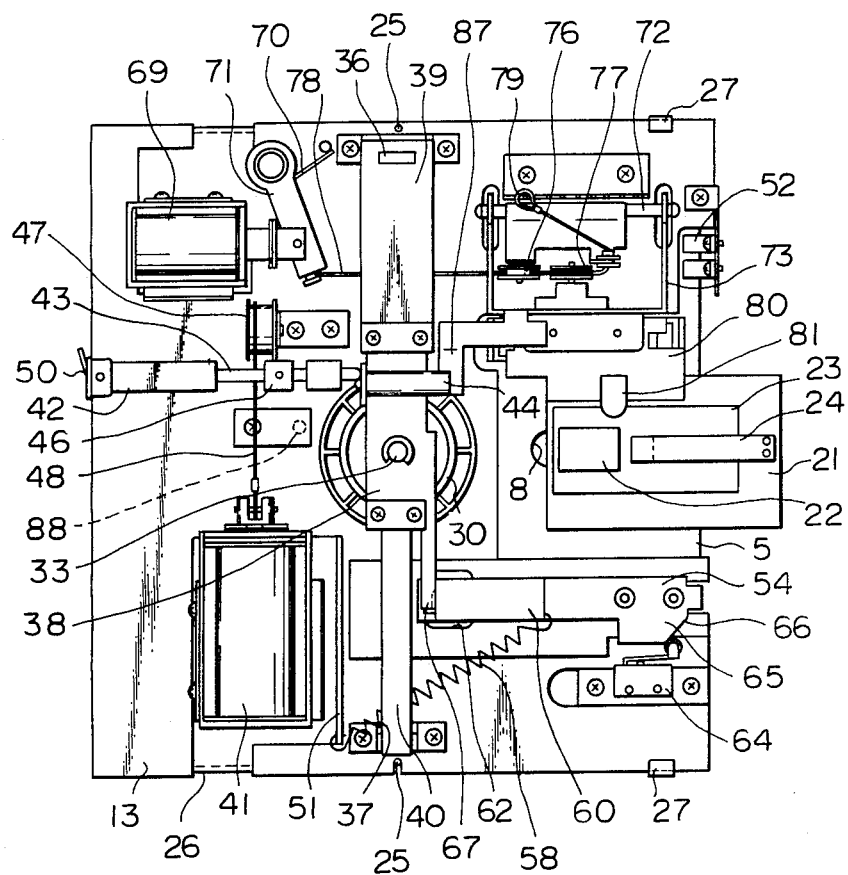
FIG. 4 is a view similar to FIG. 3 but showing the arrangement in a loaded condition.

Referring to FIG. 1 of the drawings, the floppy disc driving apparatus has a casing generally designated by the reference numeral 1. The casing 1 has mounted to its front end a cover 3 which is formed with a slot or inlet 2 for the insertion of a floppy disc 4. As shown in FIG. 2, the floppy disc 4 usable with the apparatus of the invention comprises a square jacket 5 and a thin flexible magnetic disc 6 which is rotatably encased in the jacket 5. The jacket 5 has a closed hollow configuration formed of a material which is somewhat thicker than the magnetic disc 6 and higher in rigidity than the same. The jacket 5 is provided with a central hole 7 and a slot 8 through which the magnetic disc 6 appears radially thereof. The jacket 5 is also formed with an aperture 9 in a predetermined position adjacent the central hole 7. The magnetic disc 6 on the other hand is provided with a central hole 10 which is smaller than and concentric with the central hole 7 of the jacket 5, and an aperture 11 located such that it moves past the aperture 9 of the jacket 5 while the magnetic disc 6 is rotated. Denoted by the reference numeral 12 is a label bonded to one surface of the jacket 5.

Disposed inside the casing 1 is a framework comprising a main frame (not shown) and an auxiliary frame 13 which face each other in register with the slot 2 of the cover 3. A drive hub 14 is rotatably supported in a predetermined position of the main frame. The drive hub 14 is mounted on a shaft 15 which is directly coupled with a d.c. brushless motor 16 which is in turn coaxially mounted on the back of the main frame. The drive hub 14 has a circular recess 17 in its central area and an annular marginal surface 18 surrounding the recess 17. A pair of horizontal support rods 19 and 20 are mounted in vertically parallel relation on the main frame and located deeper inside the main frame than the drive hub 14. A carriage 21 is slidably mounted on the support rods 19 and 20 to be driven by a drive source (not shown) for reciprocation. The carriage 21 supports thereon a head 22 adapted to record or reproduce data selectively engaged with that part of the magnetic disc 6 which is exposed through the slot 8 of the jacket 5. More specifically, the head 22 is mounted on a pivotable arm 24 which is constantly biased by a leaf spring 23 toward the magnetic disc 6. The main frame is provided on its front surface with a guide section which, cooperating with the back face of the auxiliary frame 13, defines a narrow disc insertion path at a substantially same level as the drive hub 14. A PC plate or the like is securely laid on the back face of the main frame.

The carriage 21 carries a pair of heads 22 and the like for recording or reproducing data at both sides of the magnetic disc 6 as is usually the case with floppy discs. It will be seen, however, that at least one head and its associated elements suffice.

The auxiliary frame 13 is detachably mounted to the main frame by mounting pieces 26 and clamps 27 while being positioned by upper and lower pins 25 which are in alignment with the drive hub 14 on the main frame. Almost all the component parts which will be described are carried on the auxiliary frame 13, except the drive hub 14, head mechanism, PC plate and the like.

The auxiliary frame 13 is formed with an opening 28 corresponding in position to the drive hub 14 and a notch 29 for accommodating the head mechanism. A cone 30 is located in alignment with the opening 28 to face the drive hub 14 in coaxial relation. The cone 30 constitutes a disc rotating mechanism together with the drive hub 14, d.c. brushless motor 16 etc. The cone 30 comprises a central frustoconical projection 31 movable into or out of the central recess 17 of the drive hub 14, and an annular flange 32 surrounding the projection 31 and facing the annular surface 18 of the drive hub 14. A shaft 33 carrying the cone 30 thereon is supported by a cone load plate 34 in a rotatable and axially movable manner. A coil spring 35 is wound round the shaft 33 between the cone 30 and the cone load plate 34. The plate 34 is supported movably in the axial direction of the shaft 33 by a boss 36 and a slot 37 which are located in upper and lower positions of the auxiliary frame 13, respectively. The plate 34 includes a rigid plate 38 parallel to the auxiliary frame 13 and adjacent to the cone 30, and leaf springs 39 and 40 individually fastened to the opposite ends of the rigid plate 38. The rigid plate 38 is constantly biased by the leaf springs 39 and 40 to move the cone 30 away from the drive hub 14.

A source of cone load drive is provided for moving the rigid plate 38 toward the drive hub 14 against the action of the leaf springs 39 and 40. The drive source comprises a cone load solenoid 41 and a transmission mechanism. A shaft 43 is rotatably supported by a boss 42 and extends over to the rigid plate 38 through its bent portion (not designated). The shaft 43 carries at one end thereof a roller 44 which is located on the rigid plate 38. The roller 44 is provided with a flange 45 and designed with an axial dimension which is larger than the widthwise dimension of the rigid plate 38. A cam 46 is mounted on the shaft 43 and operatively connected with the cone load solenoid 41 by a wire 48 through a pulley 47. The rigid plate 38 is formed with a stepped portion or shoulder 49 with which the roller 44 usually remains in locking contact. A shutter member 50 is securely mounted on the other end of the shaft 43 to open and close the slot 2 of the cover 3 in accordance with the angular movement of the shaft 43. The cone load solenoid 41 is surrounded by a shield plate 51 to be isolated thereby from the head mechanism.

A photocoupler 52 is mounted in a rear upper portion of the auxiliary frame 13. The photocoupler 52 serves as a first sensor for determining whether the leading end of the jacket 5 of the floppy disc 4 has moved past a first predetermined position $P_1$. When the leading end of the jacket 5 is in the first position $P_1$, the center of the magnetic disc 6 will be in the vicinity of the center of the drive hub 14. In detail, the first position $P_1$ is adjacent but somewhat ahead of (or closer to the slot 2) a second predetermined position $P_2$ where the cone 30 becomes engaged with the magnetic disc 6 as will be described. The d.c. brushless motor 16 is started to operate at the first position $P_1$.

An ejection mechanism 53 is mounted in a lower part of the auxiliary frame 13. The ejection mechanism 53 comprises an ejector plate 54 and a leaf spring 55 which are fastened to each other by screws 57 with a guide member 56 sandwitched therebetween. The guide member 56 is substantially the same in thickness as the auxiliary frame 13. The auxiliary frame 13 is formed with a slot 57 which receives the guide member 56 therein to permit the ejection mechanism 53 to reciprocate longitudinally. A return spring 58 is anchored at one end to shield plate 51 and at the other ehd to the ejector plate 54. The ejector plate 54 has a bent 59 at its one end for the leading end of the jacket 5 to engage, a stepped portion 60 and a rectangular opening 61 at the other end. The leaf spring 55 is movable in pressing contact with the back face of the auxiliary frame 13 and is formed at its free end with a stepped portion 63 for selective engagement in a rectangular opening 62 in the auxiliary frame 13. The stepped portion 63 of the leaf spring 55 defines the second position $P_2$ when engaged with the front edge of the opening 62 as will be described. The other or rear edge of the opening 62 limits the inward stroke of the ejection mechanism 53.

A microswitch 64 is mounted in a rear lower part of the auxiliary frame 13 to serve as a second sensor which senses such reciprocation of the ejection mechanism 53. The microswitch 64 is turned on and off by an actuator 65 which is formed integrally with the ejector plate 54. The actuator 65 has a tapered section 66 which turns on the microswitch 64 upon movement of the ejector plate 54 beyond the second position $P_2$ and turns it off upon return to the second position $P_2$. Thus, the ejection mechanism 53 will become locked in position at the second position $P_2$. The rigid plate 38 of the cone loading plate 34 is bent to form a presser member 67 which is adapted to unlock the ejection mechanism 53 and regulate it to a regular position $P_R$. The presser member 67 is positioned to face the rectangular opening 62 of the auxiliary frame 13. When the ejector plate 54 is in the second position $P_2$, the presser plate 67 faces the openings 61 and 62 and stepped portion 63 at a small distance d from the front end of the stepped portion 60.

A head load mechanism is disposed to an upper portion of the auxiliary frame 13. A head load solenoid 69 is mounted in a front upper part of the auxiliary frame 13. A lever 71 is connected with the head load solenoid 69 and biased by a torsion spring 70 in a direction for deenergizing the solenoid. A generally U-shaped bracket 73 as viewed in side elevation is pivotable about a shaft 72 in a rear upper region of the auxiliary frame 13. The bracket 73 is biased by a spring 74 away from the auxiliary frame 13 and operatively connected to the lever 71 through a speed reducer mechanism. In detail, a pulley 76 is secured to the auxiliary frame 13 while a pulley 77 is secured to the bracket 73. A wire 78 is passed over the pulleys 76 and 77 and stretched between the lever 71 and a locking piece 79. A bail 80 extends from the bracket 73 toward the head mechanism and has at its lower edge a flange 82 adapted to engage a hook 81 of the arm 23 to lock it in a spaced position relative to the carriage 21. The bail 80 carries at its inner side a pressure plate 84 which is biased by a leaf spring 85 away from the bail 80 while being regulated by a lug section 86. The pressure plate 84 is movable toward or away from a platen section 83 of the main frame. A tongue 87 extends from the bracket 73 in order to be regulated to an intermediate position by the roller 44 when the cone 30 has moved toward the drive hub 14.

An index sensor 88 is mounted on the auxiliary frame 13 in a position where it will face the aperture 9 of the floppy disc 4 when the latter is inserted in proper orientation into the casing 1. The index sensor 88 cooperates with the other index sensor (not shown) on the main frame to deliver an index signal upon sensing the aperture 11 of the magnetic disc 6. The cover 3 is provided with an eject button 89 to which the operator can have access to remove the floppy disc 4 from the casing 1.

Figure 14:
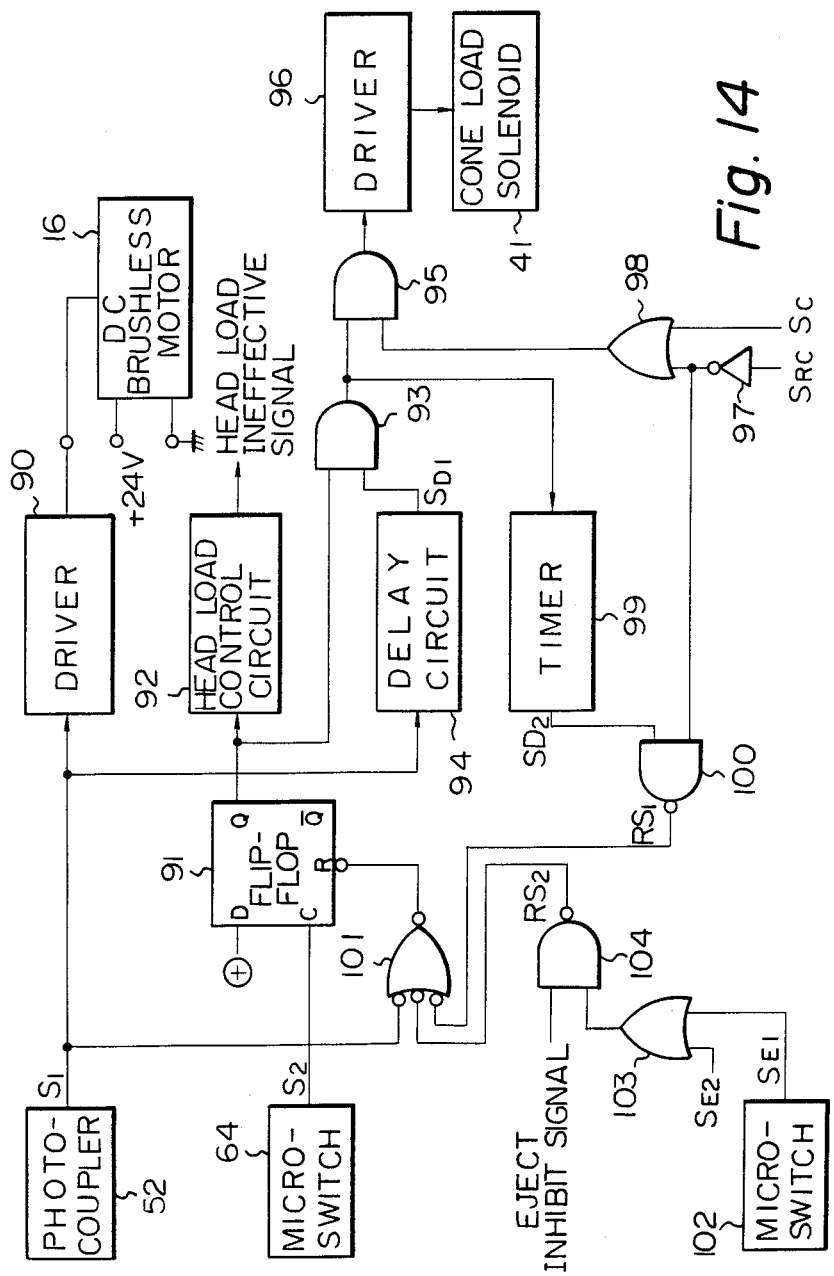
FIG. 14 is a block diagram of an electric circuit for controlling operations of the apparatus.

Referring to FIG. 14, the photocoupler 52 produces a detection output $S_1$ which is coupled to a driver 90 adapted to drive the d.c. brushless motor 16. The microswitch 64 produces a detection output $S_2$ which is fed to the C terminal of a flip-flop 91. The Q output of the flip-flop 91 is supplied to a head load control circuit 92 and to an AND gate 93. The AND gate 93 is also supplied with an output $S_{D1}$ of a delay circuit 94 which ensures a buildup time of about 0.6 seconds for the d.c. brushless motor 16. The output of the AND gate 93 is coupled to a driver 96 for the cone load solenoid 41 by way of an AND gate 95. Also coupled to the AND gate 95 is an output of an OR gate 98 which in turn receives chopper clock pulses $S_C$ and a signal given by inverting a ready set signal $S_{RC}$ by an inverter 97. A timer 99 responsive to misorientation of the floppy disc produces an output $S_{D2}$ upon the lapse of about 2 seconds after the delivery of an output of the AND gate 93 thereto. The output $S_{D2}$ is fed to a NAND gate 100 together with the output of the inverter 97. The output $RS_1$ of the NAND gate 100 is fed to a NAND gate 101 together with the signal $S_1$. A microswitch 102 incorporated in the eject button 89 produces an eject signal $S_{E1}$ which is coupled to a OR gate 103 together with an eject signal $S_{E2}$, which is derived from a system in which the floppy disc drive apparatus is built in. The output of the OR gate 103 and an eject inhibition signal are supplied to a NAND gate 104 whose output is supplied to the AND gate 101.

Figure 5:
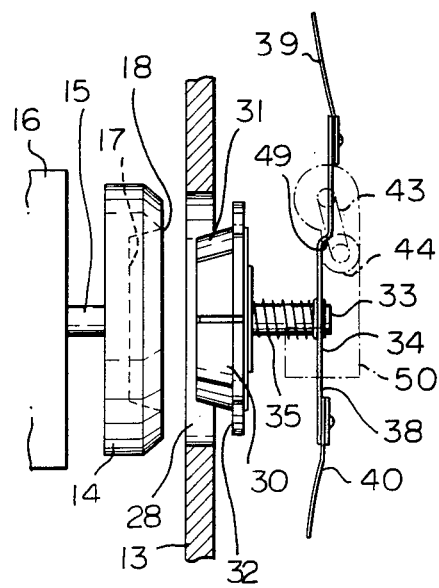
FIG. 5 is a fragmentary enlarged front view of a disc gripping section of the apparatus shown in FIG. 1 in an inoperative position.
Figure 10A:
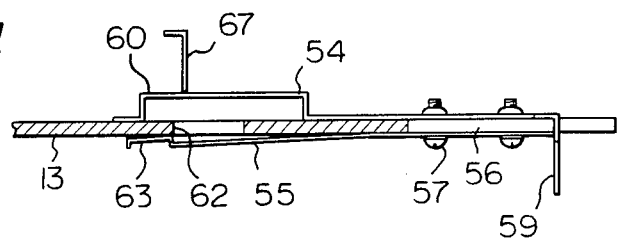
FIGS. 10a–10d are bottom end views of the ejection mechanism in successive stages of its action.
Figure 11A:
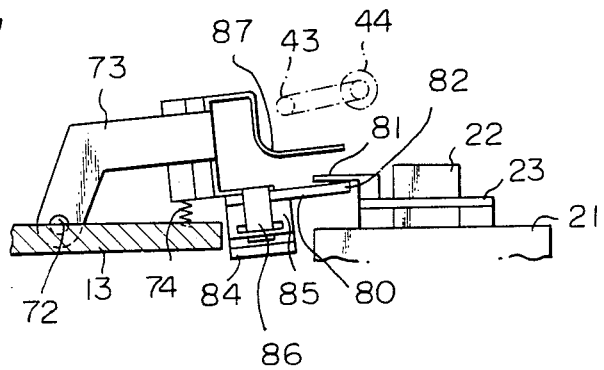
FIGS. 11a–11c are enlarged front views of a head mechanism showing its action in a different direction.

In operation, the cone load solenoid 41 remains deenergized before the floppy disc 4 is introduced into the apparatus via the inlet 2. Under this condition, the shaft 43 is not moved so that the shutter 50 keeps the inlet 2 open to permit the floppy disc 4 to be inserted therethrough. The cone load plate 34 carrying the cone 30 therewith is free from the pressure force of the roller 44. This maintains the cone 30 spaced from the drive hub 14 under the action of the leaf springs 39 and 40. As viewed in FIG. 5, a space sufficient to accommodate the floppy disc 4 is defined between the drive hub 14 and the cone 30. Such a spacing between the drive hub 14 and the cone 30 will be ensured even if the cone load solenoid 41 is energized to move the cone 30 toward the drive hub 14 before insertion of the floppy disc 4; the cone 30 would be prevented from moving because the presser member 67 integral with the cone load plate 34 is engaged with the stepped portion 60 of the ejector plate 54 as shown in FIG. 10a. The bracket 73 is biased by the spring 74 away from the auxiliary frame 13 and the roller 44 is also in its spaced position, so that the locking piece 87 remains non-restricted as shown in FIG. 11a. Accordingly, the bail 80 mounted on the bracket 73 is held in the maximum spaced position by the spring 74. Though the arm 23 with the head 22 is biased by the leaf spring 24 toward the contacting direction, it is kept in its maximum spaced position by the flange 82 of the bail 80 which is engaged with the hook 81. The floppy disc 4 can thus be inserted between the opposite heads 22 (or between the head 22 and a member facing it). In this position of the bail 80, the pressure plate 84 is also spaced from the platen section 83 to define a spacing therebetween.

The floppy disc 4 is now manually inserted into the apparatus through the inlet 2 of the cover 3. Due to the square shape, the floppy disc 4 can be inserted in eight different orientations in total considering the opposite sides thereof. However, all the orientations except that indicated by an arrow in FIG. 2 are determined improper or wrong as will be described. As the floppy disc 4 is introduced into the apparatus in any of the orientations until its leading end reaches the first position $P_1$, the photocoupler 52 senses the disc end to produce a signal $S_1$ which is coupled to the driver 90. The driver 90 is then actuated to start the operation of the d.c. brushless motor 16. Though the center of the floppy disc 4 has then been positioned adjacent the center of the drive hub 14, the magnetic disc 6 is not rotated because it has not yet been caught by the cone 30.

In parallel relation with the detection by the photocoupler 52, the floppy disc 4 urges the ejector plate 54 deeper inside the casing 1 in contact with the bent 59 of the ejector plate 54. As the floppy disc 4 is moved into the casing 1 to the second position $P_2$ where the stepped portion 63 of the leaf spring 55 resiliently drops into the rectangular opening 62 of the auxiliary plate 13, the actuator 65 integral with the ejector plate 54 turns on the microswitch 64. The floppy disc 4 is then moved beyond the second position $P_2$ over the distance from the point where the stepped portion 63 is engaged with the front edge of the opening 62 as indicated by a solid line in FIG. 10b to the point where it becomes engaged with the rear edge as indicated by a phantom line in FIG. 10b. The microswitch 64 is kept turned on during this movement of the floppy disc 4. When the operator releases the floppy disc 4, the ejection mechanism 53 is returned by the spring 58 to the second position $P_2$ indicated by the solid line. Then, the microswitch 64 is turned off producing a signal $S_2$ which indicates the release of the floppy disc 4 after the movement beyond the second position $P_2$. At the buildup of the signal $S_2$ to the "OFF" level, the flip-flop 91 is set to produce a Q output which changes the output of the head load control circuit 92 from the "head load ineffective" level to the "head load effective" level. At the same time, the Q output of the flip-flop 91 is coupled to the AND gate 93 which also receives an output signal $S_{D1}$ of the delay circuit 94. Then, the AND gate 93 is opened and, since a ready set signal $S_{RC}$ has not arrived yet, the driver 96 is actuated to energize the cone load solenoid 41.

Figure 6:
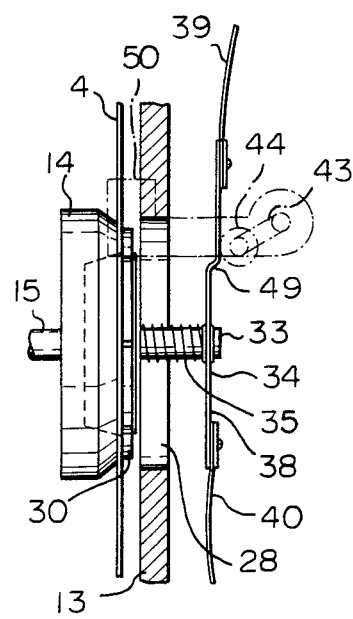
FIG. 6 is a view similar to FIG. 5 but showing the gripping section in an operative position.
Figure 7:
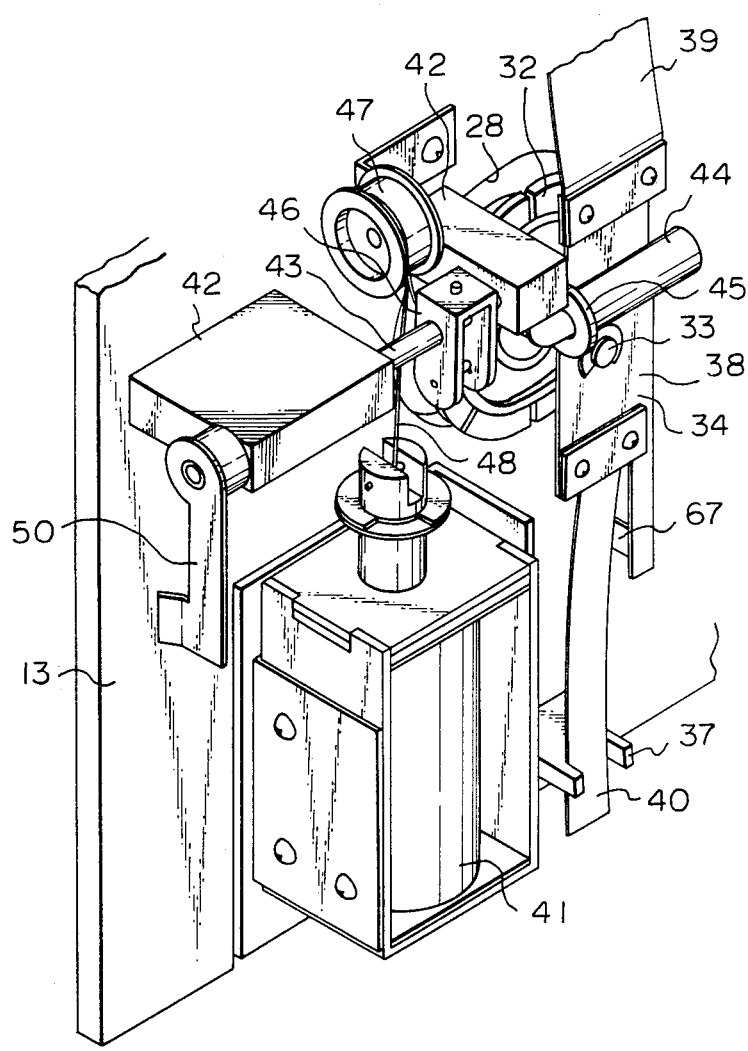
FIG. 7 is a fragmentary enlarged view of the apparatus shown in FIG. 1 in an unloaded condition.
Figure 8:
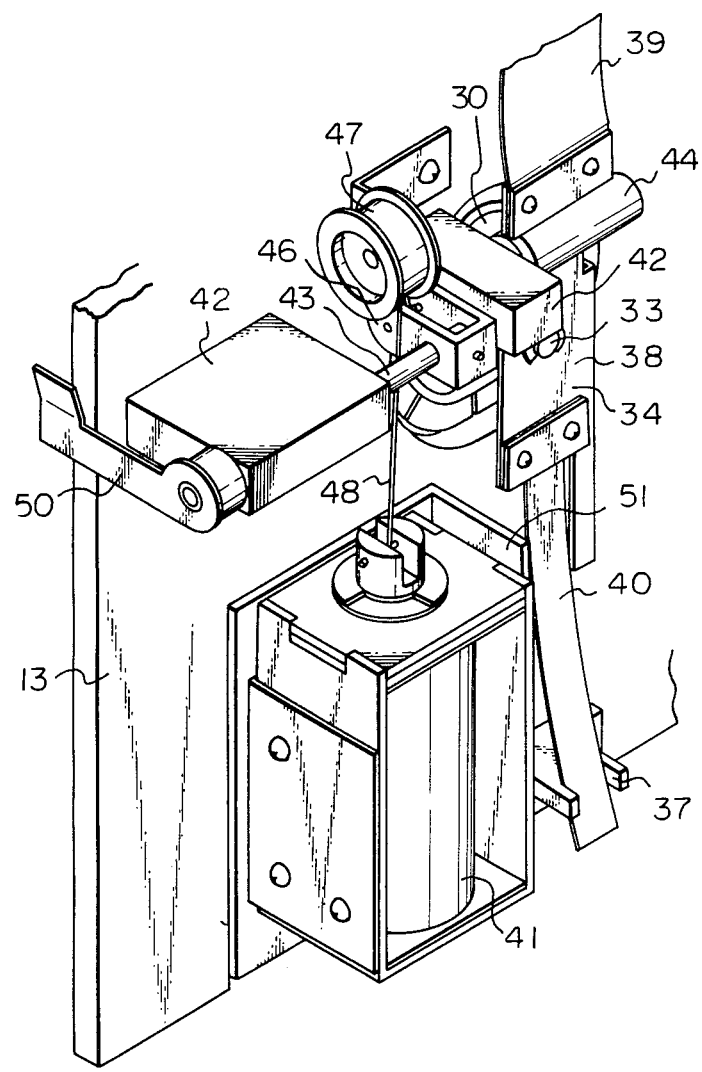
FIG. 8 is a view similar to FIG. 7 but showing the same section in a loaded condition.
Figure 9:
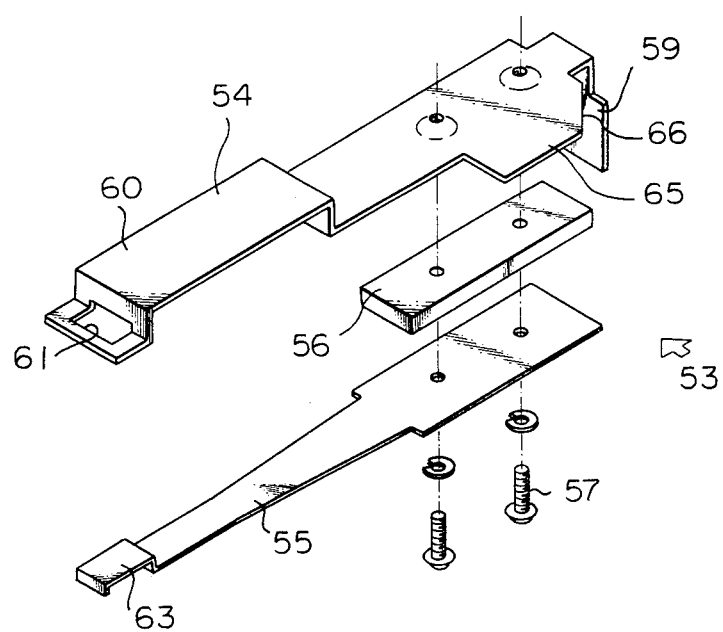
FIG. 9 is an exploded perspective view of an ejection mechanism included in the apparatus of FIG. 1.
Figure 10B:
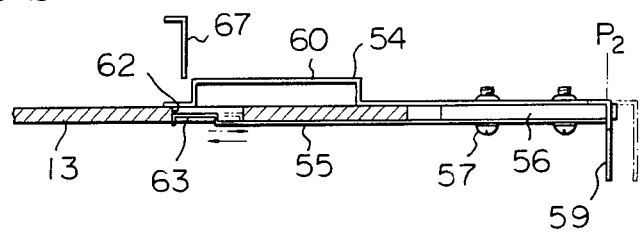
Figure 10C:
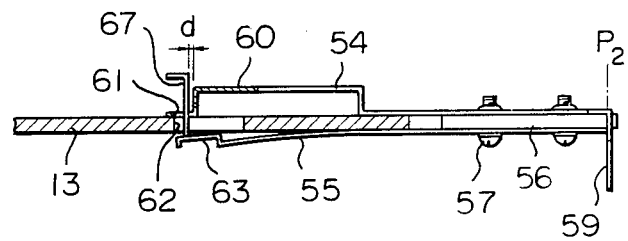
Figure 10D:
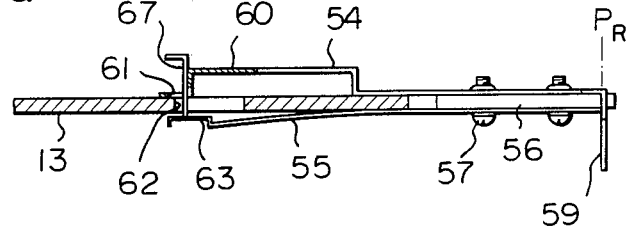

The cone load solenoid 41 thus pulls the wire 48 to angularly move the shaft 43 via the pulley 47 and cam 46 so that the roller 44 at the end of the shaft 43 rides over the shoulder 49 of the rigid plate 38 to the position shown in FIG. 6. In this position, the roller 44 presses the cone load plate 34 toward the drive hub 14. The rigid plate 38 then approaches the auxiliary frame 13 in parallel thereto deforming the leaf springs 39 and 40, whereby the cone 30 is moved straight toward the drive hub 14. As a result, the magnetic disc 6 becomes gripped by the annular surface 18 of the drive hub 14 and the annular flange 32 of the cone 30 along its opposite exposed areas around the central hole 10. Under the action of the spring 35, the magnetic disc 6 is turned within the jacket 5 in accordance with the rotation of the drive hub 14. The specific part of the roller 44 which urges the rigid plate 38 is so designed as not to go beyond its upper limit as indicated in FIG. 6. Concerning the ejection mechanism 53, after the mechanism 53 has returned to the second position $P_2$ as shown in FIG. 10b, it is locked in position or unable to perform ejection due to the engagement of the stepped portion 63 of the leaf spring 55 in the opening 62. Thus, an unlocking operation takes place in parallel relation with the disc setting operation caused by the cone load solenoid 41. For unlocking the mechanism 53, the presser member 67 is moved along with the movement of the rigid plate 38 toward the auxiliary frame 13. As shown in FIG. 10c, the presser member 67 is passed through the openings 61 and 62 to press the stepped portion of the leaf spring 55 out of the opening 62. At this instant, a gap d is left between the presser member 67 and the front end of the stepped portion 60 as shown in FIG. 10c, so that upon the release of the stepped portion 63 from the opening 62 the ejection mechanism 53 is urged by the spring 58 through the distance equal to the gap d as viewed in FIG. 10d. The floppy disc 4 is moved together with the mechanism 53 to the regular position $P_R$ by the bent 59. While this movement of the floppy disc 4 to the regular position $P_R$ occurs during the travel of the cone 30 toward the drive hub 14, no problem arises because it precedes the final contact of the annular surface 18 and flange 33 with the floppy disc 4. In this manner, the cone load solenoid 41 can be operated automatically to grip the floppy disc 6 between the drive hub 14 and the cone 30 only if the floppy disc 4 is inserted into the apparatus and then released.

Figure 15:
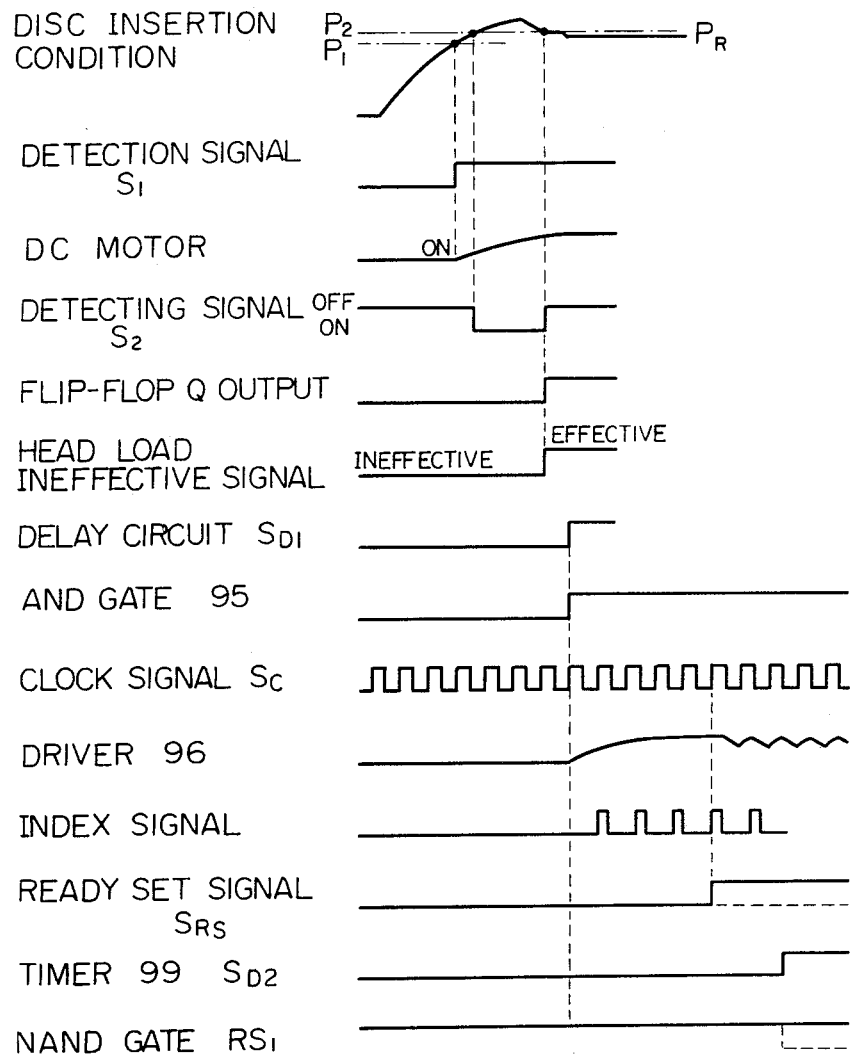
FIG. 15 is a timing chart representing timed operations of the circuit shown in FIG. 14.

After the magnetic disc 6 has been set as described above, the orientation of the floppy disc 4 inside the casing 1 is checked. If the floppy disc 4 has been inserted in the proper direction as indicated by an arrow in FIG. 2, the aperture 9 in the jacket 5 is positioned to face the index sensor 88 so that the aperture 11 in the magnetic disc 6 can be sensed by the index sensor 88 during the rotation of the magnetic disc 6. When four successive index signals are fully counted as indicated in FIG. 15, a ready set signal is generated to allow the current set condition to be maintained. If the direction of insertion of the floppy disc 4 is wrong, the aperture 9 becomes misaligned with the index sensor 88 which then produces no index signal. Based on the resultant absence of a ready set signal, the direction of insertion is determined wrong in response to a delayed output $S_{D2}$ of the timer 99. Then the NAND gate 100 delivers an output $RS_1$ as indicated by a dotted line in FIG. 15. The flip-flop 91 is reset through the AND gate 101 to in turn close the AND gate 93. This deenergizes the cone load solenoid 41 to return the cone 30 as will be described, causing the ejection mechanism 53 to discharge the floppy disc 4.

A prior art apparatus of the kind concerned cannot sense a wrong orientation of a floppy disc in its casing unless the system with the apparatus makes a right/-wrong access to the floppy disc. The time period consumed from the instant of insertion to that of orientation check is embarrassing to the operator. Moreover, it is not furnished with any automatic discharging function though capable of providing an error display when the orientation is wrong. With the apparatus of the present invention, the floppy disc 4 ejected to the inlet 2 will immediately show the operator that the cause of the trouble is the misorientation of the floppy disc 4 and urge him or her to reinsert it in a proper orientation. If desired, an audible alarm of a specific frequency may be generated or a light emitting diode may be energized each in response to the misorientation detection output. There may occur that, after the floppy disc 4 has been released after inserted into the casing 1 beyond the second position $P_2$, as is detected by the microswitch 64 which then sets the flip-flop, the floppy disc 4 is returned accidentally beyond the first position $P_1$ toward the inlet 2 depending on the condition of insertion. In such a situation, the output $S_1$ of the photocoupler 52 disappears and the flip-flop 91 is reset through the AND gate 101, so that the cone load solenoid 41 is not driven at all to prevent the magnetic disc 6 from being gripped. This keeps the cone 30 inoperative and eliminates damage to the magnetic disc 6, despite the misalignment of the drive hub 14 and cone 30 with the central hole 10 of the magnetic disc 6.

After the floppy disc 4 has been properly loaded and set in the casing 1 and a ready set signal $S_{RC}$ produced, the cone load solenoid 41 is energized to grip the magnetic disc 6. At this instant, the cone load solenoid 41 is subjected to a chopper control. At an initial stage of the disc setting operation, a large current is supplied to the solenoid 41. However, while the ready set signal $S_{RC}$ is appearing, the AND gate 95 is repeatedly opened and closed by the chopper clock pulses $S_C$ so that the current flows through the driver 96 as shown in FIG. 15. Thus, under the set condition of the floppy disc 4, power consumption is cut down as well as heat generation. It will be apparent that the switching action to the chopper control may be performed by a timer upon the lapse of a given period of time after the solenoid 41 has been driven, instead of relying on the ready set signal $S_{RS}$.

The shutter 50 swings about 90° in accordance with the rotation of the disc 43 to the disc setting position, thereby closing the inlet 2. In view of the firm grip of the magnetic disc 6 by the drive hub 14 and cone 30, the shutter 50 may be needless and the inlet 2 kept open. Nevertheless, the jacket 5 is not entirely free from the possibility of displacement during rotation of the magnetic disc 6, which would cause damage to the jacket 5 or the magnetic disc encased therein. The shutter 50 prevents such a displacement of the jacket 5 at the front, the bent 59 functioning in the same way at the rear. Another function of shutter 50 is to avoid double insertion of floppy discs 4 due to the fact that the shutter 50 extends across the inlet 2. Preferably, the shutter 50 is located somewhat above or below the vertically intermediate level of the inlet 2. Should it be at the vertically intermediate level, it might touch the operator's hand when the floppy disc 4 is inserted into the apparatus.

Figure 11B:
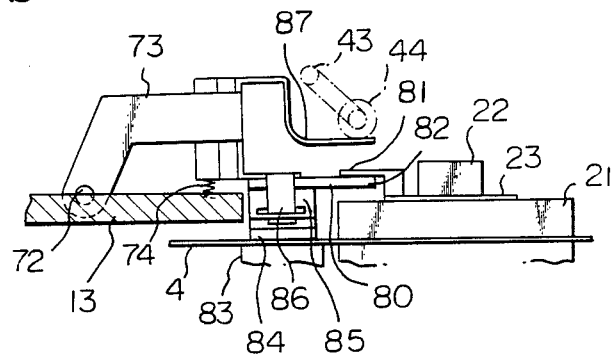
Figure 11C:
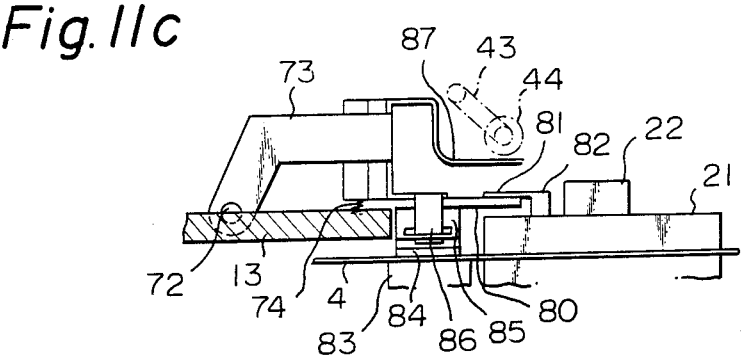
Figure 12:
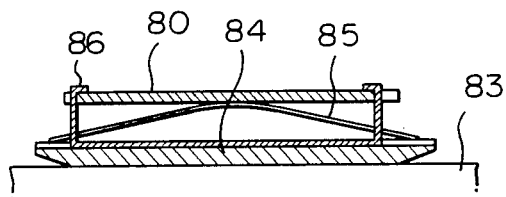
FIG. 12 is a fragmentary horizontal section of the head mechanism.

Concerning the head mechanism, the tongue 87 of the bracket 73 remains free before the magnetic disc 6 is set in position as described. When the magnetic disc 6 is inserted into the apparatus, the roller 44 in setting motion urges the tongue 87 until the bracket 73 and bail 80 become displaced to an intermediate position as shown in FIG. 11b. In this intermediate position, the bail 80 is located closer to the magnetic disc 6 than in its original position but, at the same time, urged by the spring 74 within the range where it is regulated by the roller 44 and tongue 87. Accordingly, the bail 80 holds the arm 23 and head 22 in an intermediate position where the head 22 is prevented from contacting the magnetic disc 6. At this instant, the pressure plate 84 neighbors or contacts the floppy disc 4 on the platen section 83.

Under this condition, the carriage 21 is suitably moved to turn on and off the head load solenoid 69 whereby the head 22 is brought into or out of contact with the magnetic disc 6 to record or reproduce desired data. As the head load solenoid 69 is energized, the wire 78 is pulled by the solenoid 69 through the lever 71 to in turn urge the bracket 73 with the pulley 77 downward. Then, the bail 80 on the bracket 73 is urged downwardly against the action of the leaf spring 85 causing the pressure plate 84 into pressing contact with the floppy disc 4. As a result, the hook 81 becomes free from the restriction by the flange 82 so that the arm 23 swings under the action of the leaf spring 24 to bring the head 22 into contact with the magnetic disc 6 through the slot 8. It will be seen that the movement of the solenoid 69 is transmitted to the head 22 after decelerated by the wire 78 and pulleys 76 and 77 and, therefore, the head 22 is prevented from hitting against the magnetic disc 6 to damage it. Another measure employed against damage to the magnetic disc 6 is the movement of the head 22 into contact with the magnetic disc 6 not from its original position but from the intermediate position regulated by the roller 44 and tongue 87. As such also permits the use of a small size head load solenoid 69. Meanwhile, the connection between the head load solenoid 69 and the bracket 73 through the wire 78 allows the solenoid 69 to be located remote from the head 22 as illustrated. This is advantageous in the aspect of magnetic interference. To disengage the head 22 from the magnetic disc, the solenoid 69 is deenergized to cause the bracket 73 and bail 80 to be urged upwardly by the spring 74 and leaf spring 85. Then, the arm 23 and head 22 are moved away from the magnetic disc 6 to their intermediate position. In short, the motion of the head 22 into or out of contact with the magnetic disc 6 during a data recording or reproducing operation takes place between the intermediate position and the contact position.

The floppy disc 4 can be discharged by pressing the eject button 89 after a data recording or reproducing operation has been completed. Upon depression of the eject button 89, the microswitch 102 is turned on to produce an eject signal $S_{E1}$ in response to which the NAND gate 104 delivers an output $R_{S2}$ to reset the flip-flop 91. This closes the AND gate 93 and thereby turns off the cone load solenoid 41. Then, the pulling force on the wire 43 disappears and the shaft 43 and roller 44 having pressed the rigid plate 38 becomes free. Then, the rigid plate 38 is automatically urged by the leaf springs 39 and 40 back to their spaced position. The cone 30 is also moved away from the drive hub 14 to release the magnetic disc 6. Also, at the head mechanism, the roller 44 is moved away from the tongue 87 causing the bracket 73 and, therefore, the head 22 to regain the original position. Due to the movement of the rigid plate 38, the presser member 67 progressively moves outwardly of the openings 62 and 61. However, the ejection mechanism 53 remains inoperative until the leading end of the presser 67 becomes fully displaced beyond the height of the stepped portion 60. This period is utilized for returning the head 22 and cone 30 to their original positions where they obtain substantially the same conditions as those before the insertion of the floppy disc 4. As the presser 67 is disengaged from the stepped portion 60, the ejection mechanism 53 is urged by the spring 58 into a return stroke. In this return stroke, the ejector plate 54 moves the floppy disc 4 toward the inlet 2 with its bent 59 without damaging the magnetic disc 6; the head 22 and cone 30 have already been spaced apart from the magnetic disc 6. The same procedure for ejection will occur in response to the output $RS_1$ of the NAND gate 100 which indicates misorientation of the floppy disc 4 inside the casing 1. By virtue of the electric control over the disc setting and other operations, the ejection mechanism 53 can also be actuated by the eject signal $S_{E2}$ derived from a system with which the floppy disc 4 is associated, instead of relying on the depression of the eject button 89. Thus, the floppy disc 4 can be ejected immediately after a data recording or reproducing operation so as to save energy necessary for driving the d.c. brushless motor 16, cone load solenoid 41 etc.

While the head 22 is recording data in or reproducing data from the magnetic disc 6, delivery of the eject signal $S_{E1}$ or $S_{E2}$ must be inhibited which would otherwise lead to an error in the recording or reproducing operation. For this purpose, the apparatus has therein, though not shown, a mechanism which identifies and monitors an insertion condition, a ready set condition and a selection condition of the magnetic disc 6. Under the selection condition by the head, an eject inhibition signal is supplied to the NAND gate 104 to inhibit the output $S_{R2}$ thereof even if the eject signal $S_{E1}$ or $S_{E2}$ is supplied. The operator can be informed of such conditions by green and red light emitting diodes which are incorporated in the eject button 89; neither one of them is turned on under the insertion condition, the greeen diode is turned on under the ready set condition to indicate the ejectable state, and the red diode is turned on under the selection condition to inhibit ejection.

Figure 13:
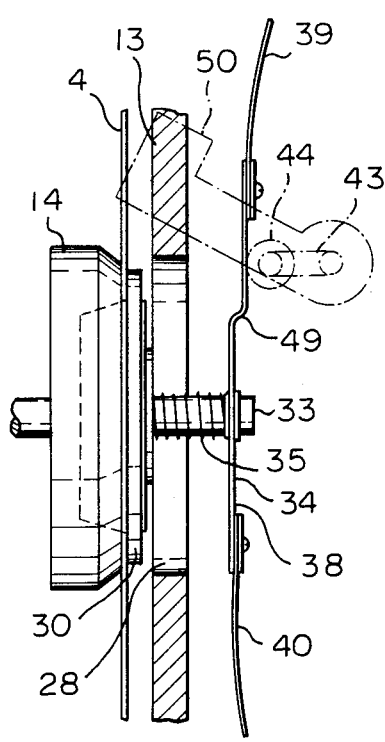
FIG. 13 is an enlarged front view of the gripping section.

When a dummy media 4a is inserted into the apparatus of the type whi automatically grips the magnetic disc 6 as in the illustrated embodiment, before the apparatus is powered as during transportion, the cone load solenoid 41 remains deenergized so that the dummy media 4a is not set and the head 22 remains stationary, different from a prior art apparatus. However, the shutter 50 is movable in the closing direction to such an extent that the roller 44 on the shaft 43 urges the rigid plate 38 beyond its upper limit as indicated in FIG. 13. In this condition, the returning force exerted by the leaf springs 39 and 40 is limited and the dummy media 4a is held under pressure. Thus, while the apparatus is isolated from a power source as during transportation, conditions similar to the described set conditions are attained and maintained with the head 22 in the intermediate position. This protects the various component parts from damage attributable to their vibration.

The d.c. brushless motor 16 employed for driving the magnetic disc 6 may be replaced by an ordinary a.c. motor and belt drive system. The a.c. motor may be started after the magnetic disc 6 has been set in place. However, as previously discussed, a d.c. motor is advantageous over an a.c. motor because the latter needs frequency adjustment depending on the area for use. The rush current inherent in the d.c. brushless motor 16 is prevented in accordance with the present invention due to the design wherein the d.c. brushless motor 16 is started prior to a disc setting action in response to an output $S_1$ of the photocoupler 52. Conversely, the motor 16 may be driven after a timer has counted a certain period of time from the instant the cone load solenoid 41 had been energized by a ready set signal $S_{RS}$, in order to ensure a current capacity.

Almost all the component parts of the apparatus except the motor 16, drive hub 14 and head mechanism are mounted on the auxiliary frame 13 which is detachably mounted to the main frame by the mounting pieces 26, clamps 27 etc. This promotes quick and easy maintenance of the apparatus.

Figure 16:
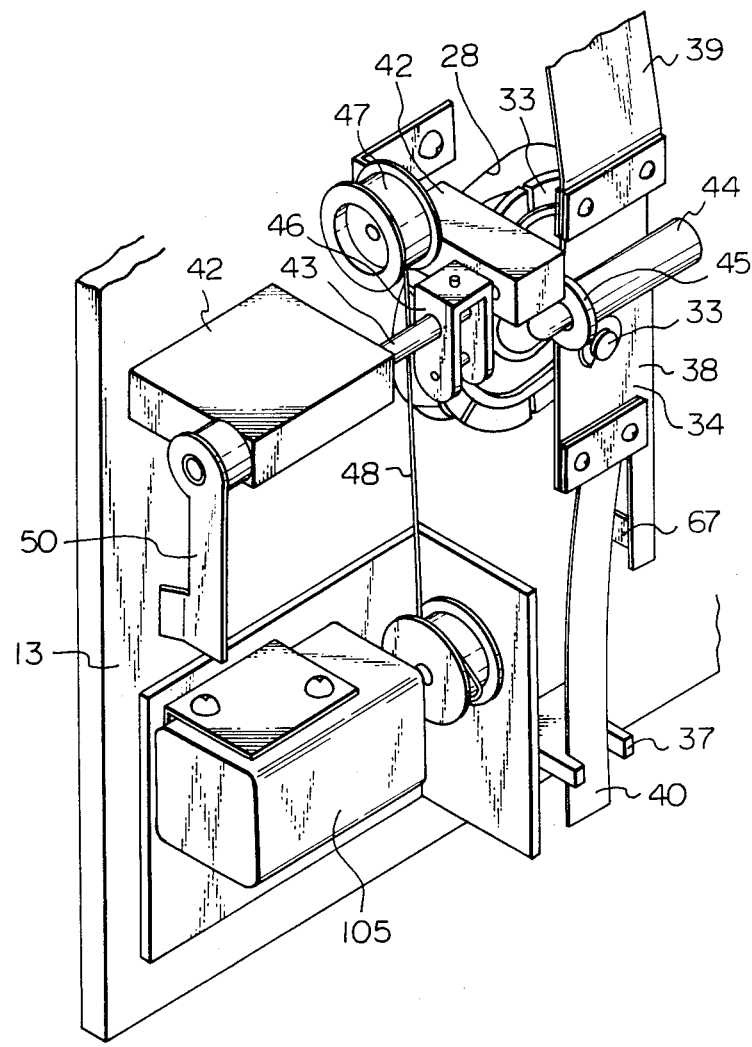
FIG. 16 is a perspective view of a modified embodiment of the present invention.

The cone load solenoid 41 as a cone load drive source may be replaced by a d.c. brushless motor 105 as indicated in FIG. 16. Compared to the cone load solenoid 41, the d.c. brushless motor 105 generates less noise and sets the cone 30 in a manner smooth enough to avoid damage to the area of the magnetic disc around the central hole 10. Considering power consumption by the cone load solenoid 41 while the disc is loaded, two solenoids may be employed, one for setting the cone 30 and the other for resetting the same.

In summary, it will be seen that the present invention provides a floppy disc driving apparatus which permits the use of a d.c. motor without causing any rush current therethrough, promotes efficient manipulation due to the automatic location of a floppy disc in a predetermined position for recording or reproducing desired data and, if use is made of a d.c. brushless motor as a cone load drive source, causes the cone into a smooth movement for gripping the floppy disc without any damage to a magnetic disc of the floppy disc.

Various modifications will become possible for those skilled in the art after receiving the teachings of the present disclosure without departing from the scope thereof.

What is claimed is:

1. A floppy disc driving apparatus for automatically driving a floppy disc which is rotated by a driving motor about an opening formed at the center thereof when data are to be recorded in or reproduced from the floppy disc by a head mechanism, comprising:

floppy disc gripping means for drivably gripping the floppy disc at a first predetermined position inside the apparatus;

guide means for guiding the floppy disc into the apparatus in an insertion direction and out of the apparatus in an ejection direction which is opposite to the insertion direction;

biasing means urging the floppy disc out of the apparatus through the guide means in the ejection direction; and stop means for enabling the floppy disc to be manually inserted through the guide means in the insertion direction against a force of the biasing means past the first predetermined position and stopping the floppy disc at the first predetermined position when the floppy disc is subsequently manually released and moved in the ejection direction by the biasing means, the stop means comprising;

a first stop member integral with the floppy disc gripping means for enabling the floppy disc to be manually inserted through the guide means in the insertion direction against a force of the biasing means past the first predetermined position and stopping the floppy disc at the first predetermined position when the floppy disc is subsequently manually released and moved in the ejection direction by the biasing means; and a second stop member separate from the floppy disc gripping means for enabling the floppy disc to be manually inserted through the guide means in the insertion direction against a force of the biasing means past a second predetermined position which is beyond the first predetermined position in the insertion direction and stopping the floppy disc at the second predetermined position when the floppy disc is subsequently manually released and moved in the ejection direction by the biasing means;

the apparatus further comprising sensor means for sensing when the floppy disc has been manually moved in the insertion direction past the second predetermined position and returned by the biasing means in the ejection direction to the second predetermined position and stopped by the second stop member and energizing the floppy disc gripping means in response thereto;

the first stop member, upon energization of the floppy disc gripping means, being moved to engage with and release the second stop member thereby enabling the floppy disc to be moved by the biasing means in the ejection direction to be stopped in the first predetermined position by the first stop member prior to the floppy disc being gripped by the gripping means.

2. A floppy disc driving apparatus as claimed in claim 1, in which the sensor means comprises a first sensor for producing a first signal when the floppy disc is manually moved in the insertion direction beyond a third predetermined position which is ahead of the first predetermined position in the insertion direction, a second sensor for producing a second signal when the floppy disc is manually moved further in the insertion direction past the second predetermined position and returned by the biasing means in the ejection direction to the second predetermined position and means for energizing the floppy disc gripping means in response to both of the first and second signals.

3. A floppy disc driving apparatus as claimed in claim 2, in which the driving motor is energized by the sensor means in response to the first signal.

4. A floppy disc driving apparatus as claimed in claim 1, further comprising ejection means for ejecting the floppy disc from the apparatus, the ejection means comprising the biasing means.

5. A floppy disc driving apparatus as claimed in claim 4, in which the ejection means further comprises means for releasing the stop means to enable the biasing means to eject the floppy disc from the apparatus.

6. A floppy disc driving apparatus as claimed in claim 1, further comprising clamp means for clamping the floppy disc in the first predetermined position, the sensor means energizing the clamp means simultaneously with energizing the floppy disc gripping means.

7. A floppy disc driving apparatus as claimed in claim 1, in which the guide means has an inlet, the apparatus further comprising shutter means for blocking the inlet which is energized by the sensor means simultaneously with the floppy disc gripping means.

8. A floppy disc driving apparatus for automatically driving a floppy disc which is rotated by a driving motor about an opening formed at the center thereof when data are to be recorded in or reproduced from the floppy disc by a head mechanism, comprising:

floppy disc gripping means for drivably gripping the floppy disc at a first predetermined position inside the apparatus;

guide means for guiding the floppy disc into the apparatus in an insertion direction and out of the apparatus in an ejection direction which is opposite to the insertion direction;

biasing means urging the floppy disc out of the apparatus through the guide means in the ejection direction;

stop means for enabling the floppy disc to be manually inserted through the guide means in the insertion direction against a force of the biasing means past the first predetermined position and stopping the floppy disc at the first predetermined position when the floppy disc is subsequently manually released and moved in the ejection direction by the biasing means; and first sensor means for producing a first signal when the floppy disc has been moved to the first predetermined position by the biasing means and stopped thereat by the stop means, second sensor means for producing a second signal if the floppy disc is oriented in the guide means in a predetermined manner and means for ejecting the floppy disc from the apparatus if the second signal is not produced within a predetermined time after the first signal is produced.

* * * * *